US012608935B2

(12) United States Patent
Majumdar et al.

(10) Patent No.: US 12,608,935 B2
(45) Date of Patent: Apr. 21, 2026

(54) ACTIVATING A NETWORK OF TELESCOPES FOR OPTIMIZED OBSERVATION OF ASTRONOMICAL EVENTS

(71) Applicant: International Business Machines Corporation, Armonk, NY (US)

(72) Inventors: Arunava Majumdar, Chicago, IL (US); Naeem Altaf, Round Rock, TX (US); Rahul Gupta, Leander, TX (US); Soumitra Sarkar, Cary, NC (US); Samuel R. Connor, Apex, NC (US); Neil Delima, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 18/359,958

(22) Filed: Jul. 27, 2023

(65) Prior Publication Data
US 2025/0037459 A1    Jan. 30, 2025

(51) Int. Cl.
*G06V 20/30*     (2022.01)
*G06F 40/205*    (2020.01)
(Continued)

(52) U.S. Cl.
CPC ............ *G06V 20/30* (2022.01); *G06F 40/205* (2020.01); *G06F 40/279* (2020.01); *G06V 10/95* (2022.01); *H04N 23/661* (2023.01)

(58) Field of Classification Search
CPC ...... G06V 20/30; G06V 10/95; G06F 40/205; G06F 40/279; G06F 40/30; H04N 23/661
See application file for complete search history.

(56) References Cited

U.S. PATENT DOCUMENTS 8,688,833 B1    4/2014   Nishimoto
8,862,398 B2   10/2014   De Vries
(Continued)

FOREIGN PATENT DOCUMENTS

WO       WO-0019695 A1 *   4/2000   .......... H04M 11/007

OTHER PUBLICATIONS

Broccia, Gianmario. (2021). Real-Time Detection and Classification of Astronomical Transient Events: The State-of-the-Art. 10.48550/arXiv.2105.00089. (Year: 2021).*
(Continued)

*Primary Examiner* — Emily C Terrell
(74) *Attorney, Agent, or Firm* — Michael O'Keefe

(57)              ABSTRACT
In an approach for interpreting one or more astronomical events and activating a network of telescopes for optimized observation of the one or more astronomical events, a processor monitors for a set of published content regarding the one or more astronomical events. Responsive to detecting the set of published content, a processor extracts, interprets, and correlates the set of published content to identify an area in space related to the one or more astronomical events for observation. A processor implements a monitoring system, wherein the monitoring system includes one or more registered telescopes of a network of telescopes to autonomously observe the area. A processor signals the one or more registered telescopes to capture an image of the one or more astronomical events. Responsive to the one or more registered telescopes capturing the image, a processor classifies one or more objects in the image. A processor publishes the image.

20 Claims, 3 Drawing Sheets

(51) Int. Cl.
| | |
|---|---|
| *G06F 40/279* | (2020.01) |
| *G06V 10/94* | (2022.01) |
| *H04N 23/661* | (2023.01) |

(56) References Cited

U.S. PATENT DOCUMENTS

| | | | |
|---|---|---|---|
| 10,054,923 B1 | 8/2018 | Mutlaq | |
| 10,095,015 B2 | 10/2018 | Chiarini | |
| 2004/0068564 A1* | 4/2004 | Snoddy | H04L 43/0805 |
| | | | 709/225 |
| 2020/0118467 A1 | 4/2020 | Mase | |

OTHER PUBLICATIONS

Rodríguez, José-Víctor & Rodríguez-Rodríguez, Ignacio & Woo, Wai Lok. (2022). On the application of machine learning in astronomy and astrophysics: A text-mining-based scientometric analysis. Wiley Interdisciplinary Reviews: Data Mining and Knowledge Discovery. 12. 10.1002/widm.1476. (Year: 2022).*

Chun et al. A New Global Array of Optical Telescopes: The Falcon Telescope Network, Received May 1, 2018; accepted Jun. 29, 2018; published Jul. 30, 2018.*

"A Novel Method to Offer Target Audience Familiarity Aware and Context Specific Inputs to Add/Remove/Update Blocks of Contents in Scientific Documents", An IP.com Prior Art Database Technical Disclosure, IP.com No. IPCOM000258949D, IP.com Electronic Publication Date: Jun. 28, 2019, 5 pages.

"Healthcare Data Capture Causal Delay Prediction and Remediation", An IP.com Prior Art Database Technical Disclosure, IP.com No. IPCOM000269952D, IP.com Electronic Publication Date: May 27, 2022, 7 pages.

"IBM and Red Hat Technology Launch to Space on EnduroSat's Shared Sat Service", IBM, May 25, 2022, 5 pages, <https://newsroom.ibm.com/2022-05-25-IBM-and-Red-Hat-Technology-Launch-to-Space-on-EnduroSats-Shared-Sat-Service>.

"IBM, Red Hat technology launch to outer space", Behind the News, May 25, 2022, 7 pages, <https://w3.ibm.com/w3publisher/behind-the-news/endurosat>.

"Machine Learning Algorithms for Smart Meter Diagnostics", An IP.com Prior Art Database Technical Disclosure, IP.com No. IPCOM000242462D, IP.com Electronic Publication Date: Jul. 16, 2015, 53 pages.

"Observe the Night Sky", Skynet Robotic Telescope Network, University of North Carolina at Chapel Hill, Printed Apr. 17, 2023, 7 pages, <https://skynet.unc.edu/>.

D'Ottaviano, Fabio, "Prediction With Data From Designed Experimentation", An IP.com Prior Art Database Technical Disclosure, IP.com No. IPCOM000266689D IP.com Electronic Publication Date: Aug. 10, 2021, 36 pages.

Duncan, A.R., "Observation Scheduling for a Network of Small-Aperture Telescopes", Publications of the Astronomical Society of Australia, 2007, 24, 53-60, <www.publish.csiro.au/journals/pasa>.

Jia et al., "Detection and Classification of Astronomical Targets with Deep Neural Networks in Wide-field Small Aperture Telescopes", The Astronomical Journal, vol. 159, No. 5, Published Apr. 16, 2020, 10 pages.

Majumdar et al., "Cognitive Telescope Network", Proceedings of CASCON-17, Nov. 2017, Toronto, Canada, 11 pages, <http://ccode.ibm-asset.com/cas/centers/chicago/projects/research/ctn/>.

Storrie-Lombardi, Lisa, Dr., "Multi-messenger and Time-domain Astronomy", The Astronomical Event Observatory Network (AEON), Printed Apr. 17, 2023, 21 pages.

* cited by examiner

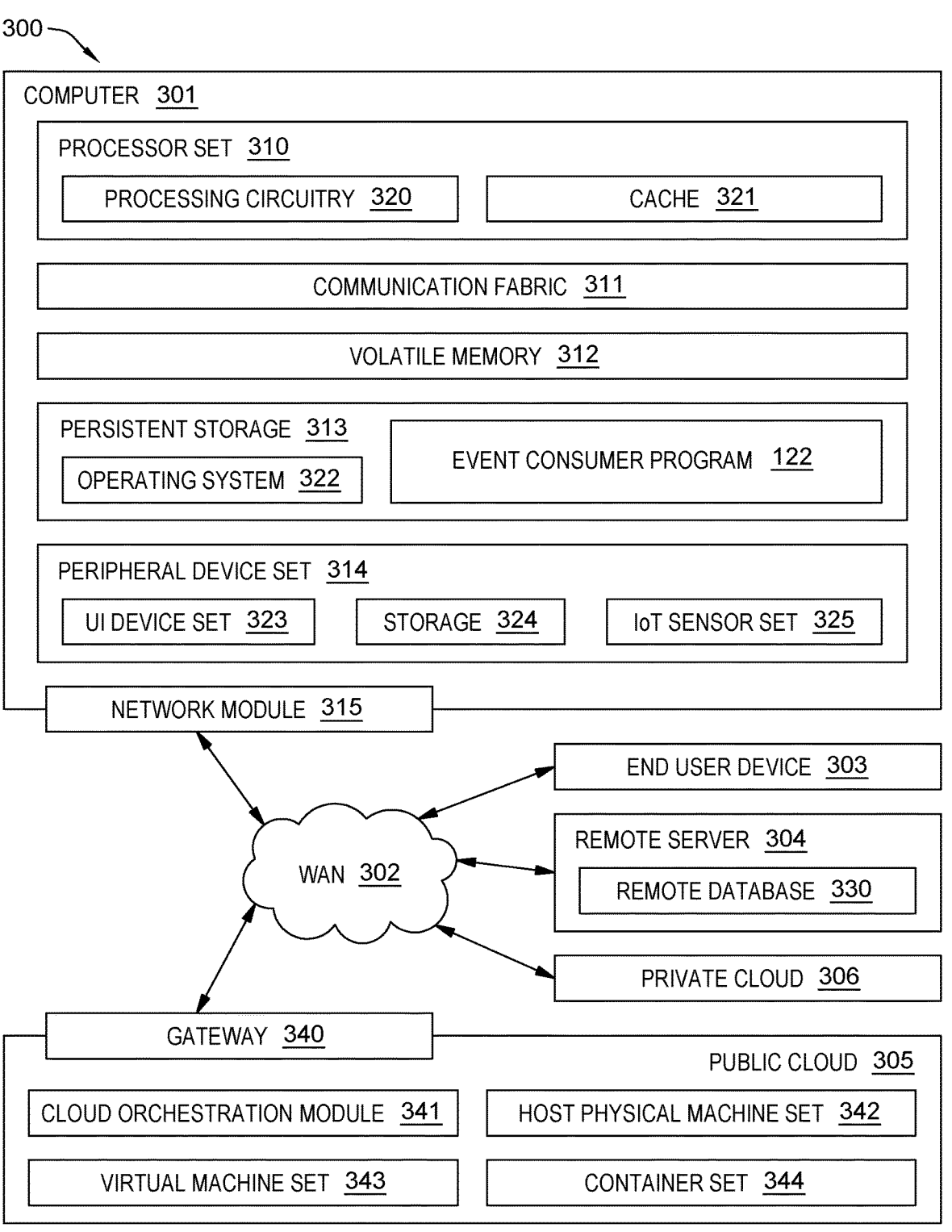

300

COMPUTER  301

PROCESSOR SET  310

PROCESSING CIRCUITRY  320          CACHE  321

COMMUNICATION FABRIC  311

VOLATILE MEMORY  312

PERSISTENT STORAGE  313

OPERATING SYSTEM  322          EVENT CONSUMER PROGRAM  122

PERIPHERAL DEVICE SET  314

UI DEVICE SET  323          STORAGE  324          IoT SENSOR SET  325

NETWORK MODULE  315

WAN  302

END USER DEVICE  303

REMOTE SERVER  304

REMOTE DATABASE  330

PRIVATE CLOUD  306

GATEWAY  340

PUBLIC CLOUD  305

CLOUD ORCHESTRATION MODULE  341          HOST PHYSICAL MACHINE SET  342

VIRTUAL MACHINE SET  343          CONTAINER SET  344

FIG. 3

ACTIVATING A NETWORK OF TELESCOPES FOR OPTIMIZED OBSERVATION OF ASTRONOMICAL EVENTS

BACKGROUND OF THE INVENTION

The present invention relates generally to the field of data processing, and more particularly to activating a network of telescopes for optimized observation of astronomical events for scientific research.

A long-awaited observational validation of gravitational waves as predicted by Albert Einstein in the early 1900's became a reality when the Laser Interferometer Gravitational-Wave Observatory (LIGO) announced the first observation in 2016. The event occurred on Sep. 14, 2015 at 5:51 A.M. Eastern Daylight Time by two detectors. The first detector was located in Livingston, Louisiana, and the second detector was located in Hanford, Washington. The only problem with the event was that there were no telescopes to observe the phenomenon.

SUMMARY

Aspects of an embodiment of the present invention disclose a method, computer program product, and computer system for interpreting one or more astronomical events and autonomously activating a network of telescopes for optimized observation of the one or more astronomical events. A processor monitors for a set of published content regarding one or more astronomical events. Responsive to detecting the set of published content regarding the one or more astronomical events, a processor extracts the set of published content regarding the one or more astronomical events. A processor interprets and correlates the set of published content regarding the one or more astronomical events using natural language understanding topical analysis to identify an area in space related to the one or more astronomical events for observation of the one or more astronomical events. A processor implements a monitoring system, wherein the monitoring system includes one or more registered telescopes of a network of telescopes to autonomously observe the area in space related to the one or more astronomical events. A processor signals the one or more registered telescopes to capture an image of the one or more astronomical events. Responsive to the one or more registered telescopes capturing the image of the one or more astronomical events, a processor classifies one or more objects in the image of the one or more astronomical events using an image classification model. A processor publishes the image of the one or more astronomical events.

In some aspects of an embodiment of the present invention, prior to monitoring for the set of published content regarding the one or more astronomical events, a processor defines a corpus of trusted sources of reference information related to astronomy, wherein the trusted sources of reference information are what are monitored for content related to the one or more astronomical events. A processor develops a taxonomy of terms related to astronomy. A processor builds a text classifier using the taxonomy of terms related to astronomy to identify one or more types of astronomical events.

In some aspects of an embodiment of the present invention, a processor parses the set of published content regarding the one or more astronomical events using a web scraping tool. A processor extracts one or more details regarding the one or more astronomical events from the set of published content. A processor classifies the one or more astronomical events based on a text classification model trained with a set of data associated with the one or more astronomical events using a natural language classifier. A processor saves the one or more astronomical events in an event queue for downstream processing.

In some aspects of an embodiment of the present invention, the one or more registered telescopes of the network of telescopes includes at least one of a terrestrial telescope, a celestial telescope, a cubesat telescope, a space telescope, and an optical observation device in orbit.

In some aspects of an embodiment of the present invention, the one or more registered telescopes of the network of telescopes of the monitoring system are selected based on a set of factors.

In some aspects of an embodiment of the present invention, the set of factors includes at least one of an availability schedule of a candidate telescope, a set of geolocation coordinates of the candidate telescope and a set of celestial location coordinates of the one or more astronomical events, a set of weather conditions, a set of properties of the candidate telescope, and a set of additional properties specified by a scientific experiment.

In some aspects of an embodiment of the present invention, subsequent to implementing the monitoring system, a processor identifies a scientific experiment to be performed by a member of a scientific research community. A processor enables the member of the scientific research community to set one or more parameters for the scientific experiment, wherein the one or more parameters correspond to a result to be obtained from the scientific experiment. A processor matches the scientific experiment to the one or more registered telescopes. A processor calculates an exposure time criterion needed to perform the scientific experiment. A processor calculates a number of images criteria needed to perform the scientific experiment.

These and other features and advantages of the present invention will be described in, or will become apparent to those of ordinary skill in the art in view of, the following detailed description of the example embodiments of the present invention.

BRIEF DESCRIPTION OF THE DRAWINGS

FIG. 3 depicts a block diagram of components of a computing environment representing the distributed data processing environment of FIG. 1, in accordance with an embodiment of the present invention.

DETAILED DESCRIPTION

Figure 1:
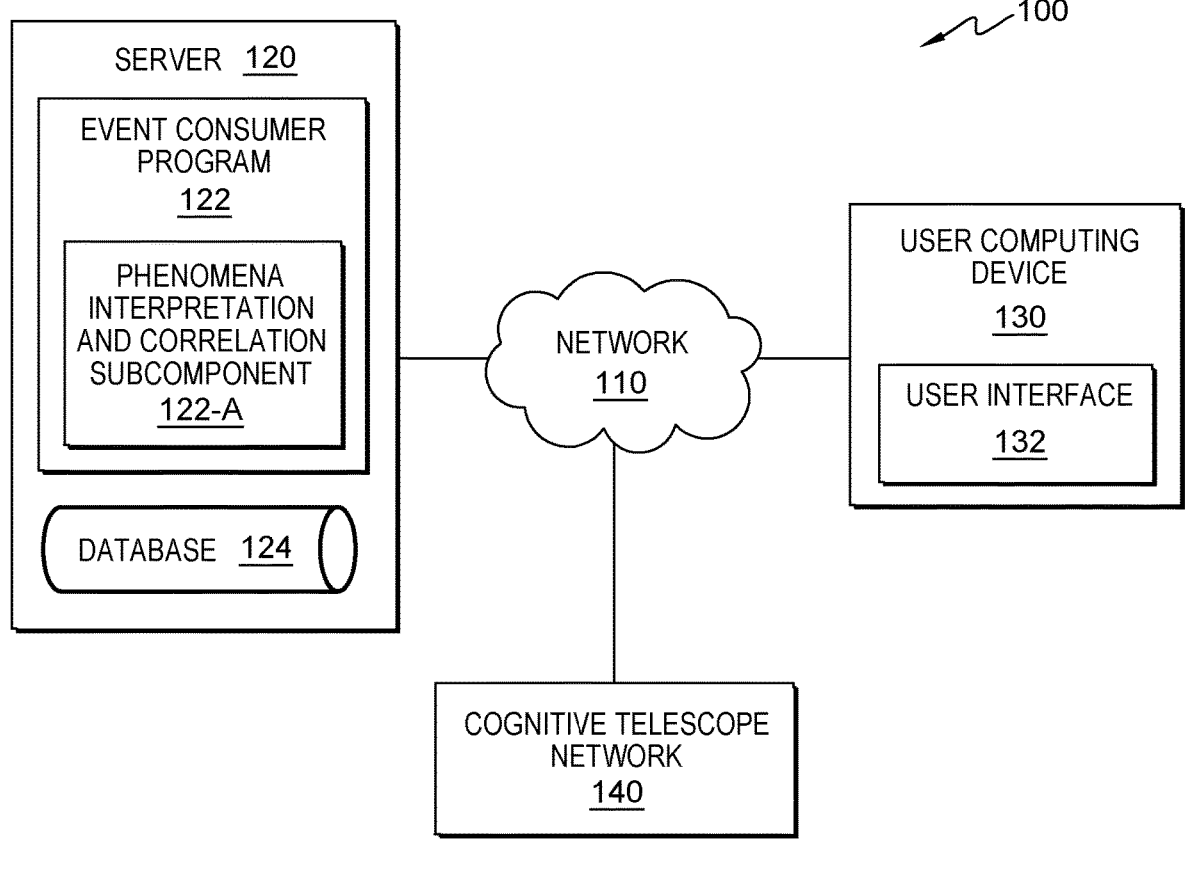
FIG. 1 is a functional block diagram illustrating a distributed data processing environment, in accordance with an embodiment of the present invention.

Embodiments of the present invention recognize that there are no real solutions to the problem that occurred when the long-awaited observational validation of gravitational waves became a reality—that being, there were no telescopes to observe the phenomenon. Embodiments of the present invention recognize that, even though the phenomenon was not observed, the lack of telescopes to observe the phenomenon led to the concept of multi-messenger astronomy and the transient astronomical phenomenon.

Multi-messenger astronomy is a type of astronomy based on a coordinated observation and interpretation of disparate "messenger" signals. Interplanetary probes may visit objects within the Solar System, but beyond that, information must come from "extrasolar messengers". There are four extrasolar messengers. The four extrasolar messengers are electromagnetic radiation, gravitational waves, neutrinos, and cosmic rays. The four extrasolar messengers are created by different astrophysical processes, and thus reveal different information about their respective sources. The main multi-messenger sources outside the heliosphere are compact binary pairs (i.e., black holes and neutron stars), supernovae, irregular neutron stars, gamma-ray bursts, active galactic nuclei, and relativistic jets. The transient astronomical phenomenon refers to an astronomical phenomena with durations of fractions of a second to weeks or years. Typically, the astronomical phenomena is an extreme, short-lived event associated with the total or partial destruction of an astrophysical object. The event may generate emission at all or specific wavelengths both in electromagnetic radiation and gravitational waves. The events may appear to be extremely bright and may be observed over cosmological distances.

Embodiments of the present invention recognize that observing the most interesting astronomical events is rare. This is due, in part, to the fact that even the largest telescopes can study only a minute part of the sky at any one time. Therefore, when an astronomical event is reported, the astronomical event is typically reported by a plurality of telescopes. This is also due, in part, to the fact that, for a survey of a large area, the number of possible observation combinations, i.e., the sequence of observations night after night, both in total time and amount of targets, is enormous. Embodiments of the present invention, however, recognize that there is enough glass on the ground across the world to observe an astronomical event with telescopes set up by astronomers as well as amateur observers. In addition to more targeted observations of astronomical events, an activation of a large global network of telescopes may lead to new discoveries in the future. Moreover, automating the processing of multiple pictures taken during the observations of the astronomical event using modem software may lead to one or more improvements in astrophotography.

Embodiments of the present invention recognize that astronomical events are constantly being surveyed by large scale sky survey telescopes, radio telescopes, etc. and interesting anomalies are reported on a daily basis. However, only a few of these phenomena are further investigated. The reason being two-fold. Firstly, the sky survey reports are not easily interpretable or consumable. The operation is mostly manual at this point with experienced astronomers interpreting and taking up follow-up decisions based on their line of work. As a result, some of the more interesting phenomenons are overlooked. Secondly, even after determining interesting events to follow up on, there are not enough connected telescopes to follow up on the investigation. Here, again, the operation is mostly manual. Telescope time is scheduled by an Observing Director at an observatory with which a research team is affiliated. This scheduling process, however, does not take into account factors like weather, which may be quite unpredictable. Moreover, the university and amateur community cannot effectively partake in the process if the university and amateur community are not interconnected, and the surveys are not monitored daily. Most of the follow-ups include only initial investigations to detect more interesting observations in the future. With a lack of scalability of the initial investigation, the important astronomical events, that can help science move forward, are missed. Therefore, embodiments of the present invention recognize the need for and provide a system and method to interpret one or more astronomical events and autonomously activate a network of telescopes for optimized observation of the one or more astronomical events.

Embodiments of the present invention further provide a system and method to consume multiple formats of data and convert the data into a canonical format that can be stored in persistent storage through an event consumer application. A subcomponent of the event consumer application can then interpret and correlate the type of phenomena using a Natural Language Processing (NLP) based model to understand a corresponding article, report, or piece of literature to assist in determining the phenomenon. Embodiments of the present invention further provide a system and method to correlate an astronomical event to one or more science experiments already setup in the system; to filter telescopes in a network of telescopes based on a position and an observation point of each telescope; to filter telescopes based on the science and the hardware available; and to filter telescopes based on weather situations. Embodiments of the present invention further provide a system and method to determine an optimized telescope tilting mechanism for telescopes monitoring the observation points and a gradation of smaller telescopes for additional coverage. This will enable an activation and precise alignment of a world-wide network of telescopes to optimize observations over a cloud network, using protocols like, but not limited to, Message Queuing Telemetry Transport (MQTT) for the observations and retrieving photographs from centralized locations like, but not limited to, a cloud object storage in a safe manner. Embodiments of the present invention lastly provide a system and method to process the photographs on the cloud network using complex algorithms for optimal outputs.

Implementation of embodiments of the present invention may take a variety of forms, and exemplary implementation details are discussed subsequently with reference to the Figures.

FIG. 1 is a block diagram illustrating a distributed data processing environment, generally designated 100, in accordance with an embodiment of the present invention. In the depicted embodiment, distributed data processing environment 100 includes server 120, user computing device 130, and cognitive telescope network 140 interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, cognitive telescope network 140, and other computing devices (not shown) and networks (not shown) within distributed data processing environment 100.

Server 120 operates to run event consumer program 122 and to send and/or store data in database 124. In an embodiment, server 120 can send data from database 124 to user computing device 130 and cognitive telescope network 140. In an embodiment, server 120 can receive data in database 124 from user computing device 130 and cognitive telescope network 140. In one or more embodiments, server 120 can be a standalone computing device, a management server, a web server, a mobile computing device, or any other electronic device or computing system capable of receiving, sending, and processing data and capable of communicating with user computing device 130 and cognitive telescope network 140 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130, cognitive telescope network 140, and other computing devices (not shown) and networks (not shown) within distributed data processing environment 100 via network 110. Server 120 may include internal and external hardware components, as depicted and described in further detail in FIG. 3.

Event consumer program 122 operates to interpret astronomical events and autonomously activate a network of telescopes for optimized observation. In the depicted embodiment, event consumer program 122 includes phenomena interpretation and correlation subcomponent 122-A. In the depicted embodiment, event consumer program 122 is a standalone program. In another embodiment, event consumer program 122 may be integrated into another software product. In the depicted embodiment, event consumer program 122 resides on server 120. In another embodiment, event consumer program 122 may reside on another computing device (not shown), provided that event consumer program 122 has access to network 110. The operational steps of event consumer program 122 are depicted and described in further detail with respect to FIG. 2.

Phenomena interpretation and correlation subcomponent 122-A operates to interpret and correlate a type of phenomena using a NLP based model to understand a corresponding article, report, or piece of literature to assist in determining the phenomenon. In the depicted embodiment, phenomena interpretation and correlation subcomponent 122-A is included in event consumer program 122.

In an embodiment, the user of user computing device 130 registers with event consumer program 122 of server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via event consumer program 122). Relevant data includes, but is not limited to, personal information or data provided by the user; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by event consumer program 122. A database is an organized collection of data. Data includes, but is not limited to, information about user preferences (e.g., general user system settings such as alert notifications for user computing device 130); information about alert notification preferences; a corpus of trusted sources of reference information related to astronomy; a taxonomy of terms related to astronomy; a taxonomy of terms related to a field of astronomical events; a set of data associated with one or more astronomical events; one or more factors regarding the one or more astronomical events; a canonical format defined; the set of content regarding the one or more astronomical events converted into the canonical format; one or more factors for clustering two or more astronomical events; one or more factors for identifying a telescope best suited to observe an astronomical event; a set of information regarding a telescope and/or an image capturing device; a science experiment, one or more parameters set for the scientific experiment; a set of data associated with the science experiment (e.g., a number of minimum telescopes, a number of desired telescopes, and a number of maximum telescopes needed to perform the scientific experiment; an exposure time criterion needed to perform the scientific experiment; and a number of images criteria (e.g., minimum, desired, maximum) needed to perform the scientific experiment); a set of factors to define a set of rules to identify one or more candidate telescopes; a prioritized list of the one or more candidate telescopes to be used to observe the consumed event; all directed search observation coordinates of a predicted area for the consumed event; an image tilting algorithm to distribute the one or more candidate telescopes and to observe the consumed event; a specific exposure time of the consumed event; a number of exposures for a setup of the one or more candidate telescopes; one or more images and/or one or more video streams captured of the consumed event; one or more objects labeled in the image and/or video stream captured; an image classification model; event type meta-data associated with the image classification model; a historic consumed event and a corresponding image data (i.e., for training purposes); and any other data received, used, and/or generated by event consumer program 122.

Database 124 can be implemented with any type of device capable of storing data and configuration files that can be accessed and utilized by server 120, such as a hard disk drive, a database server, or a flash memory. In an embodiment, database 124 is accessed by event consumer program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that event consumer program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Event consumer program 122 enables the authorized and secure processing of personal data and/or confidential company data.

Event consumer program 122 provides informed consent, with notice of the collection of personal and/or confidential company data, allowing the user to opt-in or opt-out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Event consumer program 122 provides information regarding personal and/or confidential company data and the nature (e.g., type, scope, purpose, duration, etc.) of the processing. Event consumer program 122 provides the user with copies of stored personal and/or confidential company data. Event consumer program 122 allows the correction or completion of incorrect or incomplete personal and/or confidential company data. Event consumer program 122 allows for the immediate deletion of personal and/or confidential company data.

User computing device 130 operates to run user interface 132 through which a user can interact with event consumer program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with event consumer program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132.

User interface 132 operates as a local user interface between event consumer program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from event consumer program 122 to a user via network 110. User interface 132 can also display or present alerts including information (such as graphics, text, and/or sound) sent from event consumer program 122 to a user via network 110. In an embodiment, user interface 132 can send and receive data (i.e., to and from event consumer program 122 via network 110, respectively). Through user interface 132, a user can opt-in to event consumer program 122; input information about the user; create a user profile; set user preferences and alert notification preferences; input a request for an event to be monitored; input a set of information regarding a telescope and/or an image capturing device; schedule an availability of a telescope and/or an image capturing device; set one or more parameters for a scientific experiment; receive a request for feedback; and input feedback.

A user preference is a setting that can be customized for a particular user. A set of default user preferences are assigned to each user of event consumer program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of event consumer program 122.

Cognitive telescope network 140 comprises a network of one or more telescopes and/or one or more image capturing devices that are participating in the monitoring system. The one or more telescopes and/or the one or more image capturing device of the cognitive telescope network 140 may include, but are not limited to, a terrestrial telescope, a celestial telescope, a cubesat telescope and/or camera, a space telescope, and an optical observation device in orbit. In the depicted embodiment, cognitive telescope network 140 includes one or more standalone devices that communicate with (i.e., send data to) event consumer program 122 on server 120 and user computing device 130 over network 110.

Figure 2:
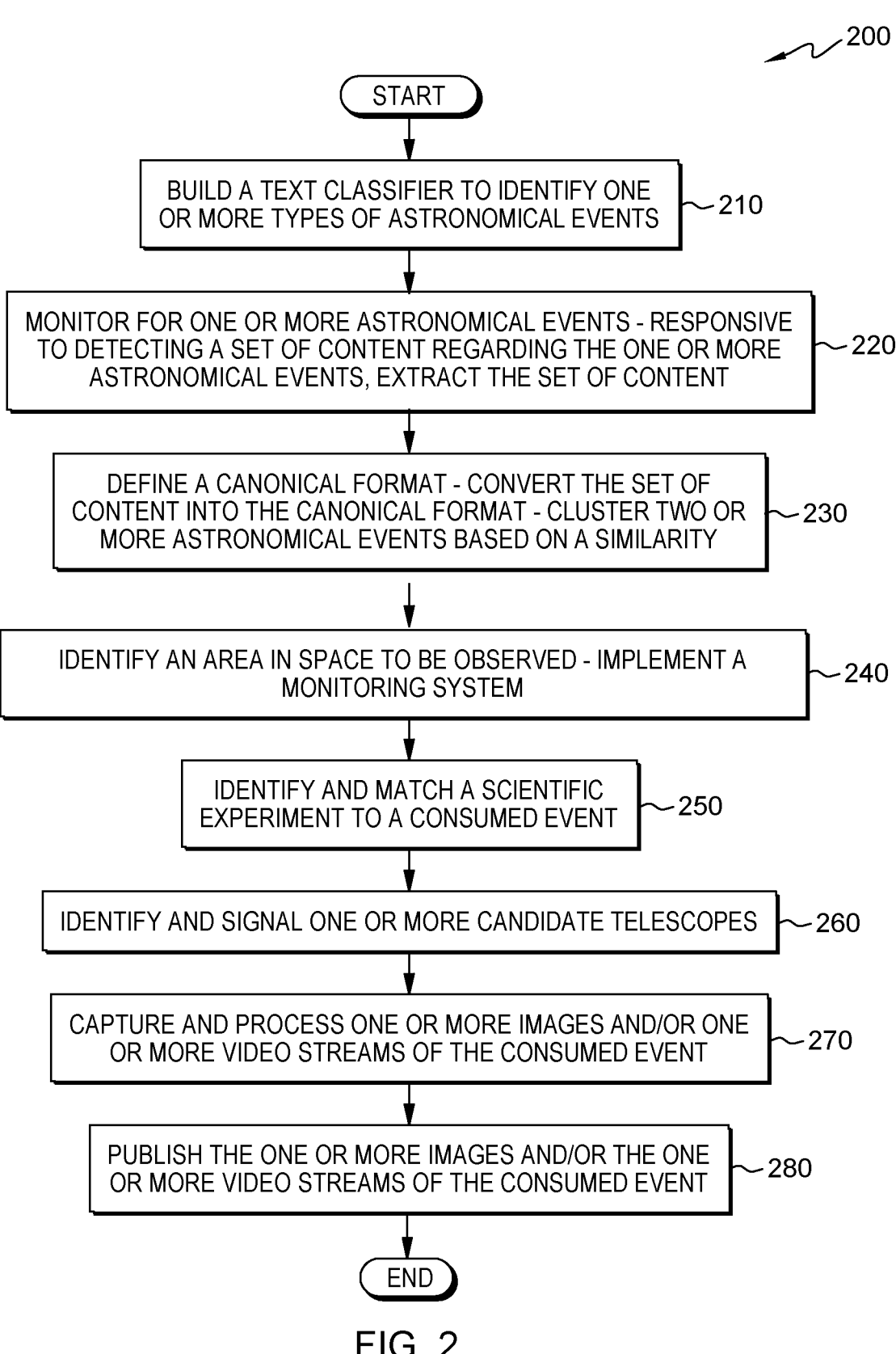
FIG. 2 is a flowchart illustrating the operational steps of an event consumer program, on a server within the distributed data processing environment of FIG. 1, in accordance with an embodiment of the present invention.

FIG. 2 is a flowchart, generally designated 200, illustrating the operational steps for event consumer program 122, on server 120 within distributed data processing environment 100 of FIG. 1, in accordance with an embodiment of the present invention. In an embodiment, event consumer program 122 operates to interpret one or more astronomical events and autonomously activate a network of telescopes for optimized observation of the one or more astronomical events. It should be appreciated that the process depicted in FIG. 2 illustrates one possible iteration of the process flow, which may be automatically repeated for a continuous period of time or which may be triggered when an event is detected. Monitoring for an event may be automated or may be initiated by a user. When monitoring for an event is automated, the monitoring may be set up to continuously or periodically monitor a source or adopt a Pub/Sub Mechanism, in which content is published by a source to which the user subscribes.

In step 210, event consumer program 122 defines a corpus of trusted sources of reference information related to astronomy. A trusted source of reference information related to astronomy may be at least one of a public source of reference information (i.e., a source of information, regardless of form or format, that is disclosed, disseminated, or made available to the public) and a private source of reference information (i.e., a source of information, regardless of form or format, that is not disclosed, disseminated, or made available to the public). A trusted source of reference information related to astronomy may include, but is not limited to, a source monitoring for an announcement made by the National Aeronautics and Space Administration (NASA), the European Space Agency (ESA), and similar agencies and organizations; a source monitoring for reference information available in a publication, a report, and a piece of literature; a source monitoring for reference information available on the internet; a source monitoring for reference information on a social media channel; a source monitoring for reference information on an information sharing site for science enthusiasts; a source monitoring for a sky survey event; a source setting up a telescope to observe the sky for an astronomical event; a source setting up a science experiment to conduct; a source sending a command remotely and securely over the internet; and a manual observer. In an embodiment, event consumer program 122 develops a taxonomy of terms. In an embodiment, event consumer program 122 develops a taxonomy of terms related to astronomy. In an embodiment, event consumer program 122 develops a taxonomy of terms related to a field of astronomical events. In an embodiment, event consumer program 122 develops a taxonomy of terms using a natural language processing (NLP) method known in the art. In an embodiment, event consumer program 122 builds a text classifier. In an embodiment, event consumer program 122 builds a text classifier using the taxonomy of terms developed. In an embodiment, event consumer program 122 builds a text classifier using a NLP text classification method known in the art. In an embodiment, event consumer program 122 builds a text classifer to identify one or more types of astronomical events cited in a trusted source of reference information related to astronomy.

In step 220, event consumer program 122 monitors for one or more astronomical events. In an embodiment, event consumer program 122 monitors for mentioning of one or more astronomical events in the trusted sources of reference information related to astronomy. In an embodiment, responsive to detecting a set of content regarding one or more astronomical events mentioned in a trusted source of reference information related to astronomy, event consumer program 122 extracts the set of content regarding the one or more astronomical events. In an embodiment, event consumer program 122 parses the set of content regarding the one or more astronomical events. In an embodiment, event consumer program 122 parses the set of content regarding the one or more astronomical events using a web scraping tool known in the art. In an embodiment, event consumer program 122 extracts one or more details regarding the one or more astronomical events. In an embodiment, event consumer program 122 extracts one or more details regarding the one or more astronomical events from the parsed set of content (i.e., from the parsing step). In an embodiment, event consumer program 122 extracts one or more details regarding the one or more astronomical events using a NLP event extraction method known in the art. In an embodiment, event consumer program 122 classifies the one or more astronomical events. In an embodiment, event consumer program 122 classifies the one or more astronomical events using a natural language classifier (NLC) known in the art. In an embodiment, event consumer program 122 classifies the one or more astronomical events using a text classification model. The text classification model may be trained with a set of data associated with the one or more astronomical events. In an embodiment, event consumer program 122 filters out an astronomical event if the astronomical event is unrelated. An astronomical event may be classified as unrelated when event consumer program 122 is unable to classify the astronomical event as being an astronomical event or classifies the astronomical event as an astronomical event with a low probability of occurring. In an embodiment, event consumer program 122 saves the one or more astronomical events (i.e., filtered and classified) in an event queue for downstream processing. In an embodiment, event consumer program 122 repeats step 220 each time a set of content regarding one or more astronomical events mentioned in a trusted source of reference information is detected and extracted.

In step 230, event consumer program 122 converts the set of content regarding the one or more astronomical events into a canonical format. In an embodiment, event consumer program 122 defines a canonical format. In an embodiment, event consumer program 122 defines a canonical format to represent the set of content regarding the one or more astronomical events extracted from the trusted source of reference information. The set of content regarding the one or more astronomical events extracted from the trusted source of reference information may be in one or more different formats. The one or more different formats may include, but are not limited to, a structured format and an unstructured format. The canonical format is a format into which the set of content regarding the one or more astronomical events may be converted so that the set of content may all be in a singular, comparable format. The canonical format is a format that may capture one or more factors regarding the one or more astronomical events including, but not limited to, a time (or timestamp) of the one or more astronomical events, a set of geological coordinates and a set of celestial coordinates of the one or more astronomical events, a detailed summary of the one or more astronomical events, and a classification of the one or more astronomical events. In an embodiment, event consumer program 122 converts the set of content regarding the one or more astronomical events extracted into the canonical format defined. In an embodiment, event consumer program 122 converts the set of content regarding the one or more astronomical events extracted into the canonical format defined using a data mapping and/or transformation method known in the art. In an embodiment, subsequent to converting the set of content regarding the one or more astronomical events into the canonical format, event consumer program 122 clusters two or more astronomical events (i.e., astronomical events detected and extracted in step 220). In an embodiment, event consumer program 122 clusters two or more astronomical events based on a similarity of one or factors. The one or more factors for clustering two or more astronomical events may include, but are not limited to, a time (or timestamp) of an astronomical event, a set of celestial coordinates of an astronomical event, and a classification of an astronomical event.

In step 240, event consumer program 122 identifies an area in space related to an astronomical event. In an embodiment, event consumer program 122 identifies an area in space related to an astronomical event from the set of content regarding the one or more astronomical events extracted from the trusted source of reference information. In an embodiment, event consumer program 122 identifies an area in space (i.e., outer space, in the sky/atmosphere) related to an astronomical event to be observed. Space, also referred to as outer space, is an expanse that exists beyond Earth and its atmosphere and between celestial bodies. Space is not completely empty; it is a near-perfect vacuum containing a low density of particles, predominantly a plasma of hydrogen and helium as well as electromagnetic radiation, magnetic fields, neutrinos, and cosmic rays. In an embodiment, event consumer program 122 implements a monitoring system. The monitoring system may be a part of event consumer program 122. The monitoring system may include, but is not limited to, a user interface and a persistent storage device. The persistent storage device, for example, may be a database responsible for registering ownership of a telescope and/or an image capturing device that may be a part of a network of telescopes and image capturing devices (e.g., cognitive telescope network 140) participating in the monitoring system. The monitoring system monitors one or more sources of data, analyzes and classifies the data found, and adds the data found to a processing queue. In an embodiment, event consumer program 122 identifies one or more telescopes registered to a network of telescopes and image capturing devices (e.g., cognitive telescope network 140). In another embodiment, event consumer program 122 identifies one or more image capturing devices registered to a network of telescopes and image capturing devices (e.g., cognitive telescope network 140). The network of telescopes and image capturing devices (e.g., cognitive telescope network 140) may include, but is not limited to, a terrestrial telescope, a celestial telescope, a cubesat telescope and/or camera, a space telescope, and an optical observation device in orbit. In an embodiment, event consumer program 122 identifies the one or more telescopes registered to the network of telescopes and image capturing devices (e.g., cognitive telescope network 140) and best suited to observe the astronomical event based on one or more factors. The one of more factors to identify the one or more telescopes best suited to observe the astronomical event may include, but are not limited to, a specification of a telescope, the geographic location of a telescope, an availability of a telescope, and a weather condition in a geographic location of a telescope. In an embodiment, event consumer program 122 identifies one or more telescopes not registered (i.e., currently/at the present time) to the network of telescopes and image capturing devices (e.g., cognitive telescope network 140). In another embodiment, event consumer program 122 identifies one or more image capturing devices not registered to the network of telescopes and image capturing devices (e.g., cognitive telescope network 140). In an embodiment, event consumer program 122 gathers a set of information. In an embodiment, event consumer program 122 gathers a set of information from a user associated with a telescope (i.e., via a user interface (e.g., user interface 132) of a user computing device (e.g., user computing device 130)). The set of information is needed to register the telescope and/or the image capturing device. The set of information may include, but is not limited to, a username and a login credential of a user associated with the telescope and/or the image capturing device, a specification of the telescope and/or the image capturing device, the geographic location of the telescope and/or the image capturing device, an availability of the telescope and/or the image capturing device, and a category of events that the user associated with the telescope and/or the image capturing device may be interested in following. In an embodiment, event consumer program 122 inputs the set of information into the network of telescopes and image capturing devices (e.g., cognitive telescope network 140). In an embodiment, event consumer program 122 enables the user associated with the telescope to schedule an availability of a telescope. In another embodiment, event consumer program 122 enables the user associated with the image capturing device to schedule an availability of an image capturing device. In an embodiment, event consumer program 122 enables the user associated with the telescope to schedule an availability of a telescope via a user interface (i.e., user interface 132) of a user computing device (i.e., user computing device 130).

In step 250, event consumer program 122 identifies a scientific experiment. In an embodiment, event consumer program 122 identifies a scientific experiment being conducted by a member of a scientific research community. The member of the scientific research community may be, but is not limited to, a user associated with a telescope and/or an image capturing device and one or more additional scientists. The scientific experiment is to be performed by the member of the scientific research community. In an embodiment, event consumer program 122 enables the member of the scientific research community to set one or more parameters for the scientific experiment. In an embodiment, event consumer program 122 enables the member of the scientific research community to set one or more parameters for the scientific experiment via a user interface (e.g., user interface 132) of a user computing device (e.g., user computing device 130). The one or more parameters correspond to a result that the member of the scientific research community is looking to obtain from the scientific experiment (hereinafter referred to as a "consumed event") and one or more instruments to be used to perform the scientific experiment. The one or more instruments to be used to perform the scientific experiment may include, but are not limited to, a telescope, an image capturing device, and a filter. In an embodiment, event consumer program 122 determines a rarity of an occurrence of the consumed event. In an embodiment, event consumer program 122 determines a relevance of the occurrence of the consumed event to a scientific community. In an embodiment, event consumer program 122 matches the scientific experiment to one or more telescopes. In another embodiment, event consumer program 122 matches the scientific experiment to one or more image capturing devices. In an embodiment, event consumer program 122 matches the scientific experiment to one or more telescopes based on the one or more parameters set by the member of the scientific research community. In an embodiment, event consumer program 122 filters out one or more telescopes that are unrelated to the scientific experiment. In an embodiment, in a case of a single coordinate event, event consumer program 122 configures a number of minimum telescopes, a number of desired telescopes, and a number of maximum telescopes needed to perform the scientific experiment. The number of minimum telescopes, the number of desired telescopes, and the number of maximum telescopes needed are pre-set at default values. The default values are 1, 10, and 10, respectively. In an embodiment, event consumer program 122 calculates an exposure time criterion needed to perform the scientific experiment. In an embodiment, event consumer program 122 calculates an exposure time criterion needed to perform the scientific experiment using a pluggable algorithm known in the art. In an embodiment, event consumer program 122 calculates a number of images criteria (e.g., minimum, desired, maximum) needed to perform the scientific experiment. In an embodiment, event consumer program 122 calculates a number of images criteria (e.g., minimum, desired, maximum) needed to perform the scientific experiment using a pluggable algorithm known in the art.

In step 260, event consumer program 122 identifies and signals one or more candidate telescopes. In an embodiment, event consumer program 122 defines a set of rules to identify one or more candidate telescopes. In an embodiment, event consumer program 122 defines a set of rules to identify one or more candidate telescopes using a determinist rule engine. In an embodiment, event consumer program 122 defines a set of rules to identify one or more candidate telescopes based on a set of factors. The set of factors may include, but are not limited to, a set of properties of a candidate telescope, an availability schedule of a candidate telescope, a set of geolocation coordinates of a candidate telescope and a set of celestial location coordinates of the consumed event, a set of weather conditions and other atmospheric conditions, and a set of additional properties specified by the scientific experiment. In an embodiment, event consumer program 122 creates a prioritized list of the one or more candidate telescopes to be used to observe the consumed event. In an embodiment, event consumer program 122 dynamically re-prioritizes the list of the one or more candidate telescopes based on the consumed event determined to be observed. In an embodiment, event consumer program 122 determines all directed search observation coordinates of a predicted area for the consumed event. In an embodiment, event consumer program 122 computes an image tilting algorithm to distribute the one or more candidate telescopes and to observe the consumed event using the one or more candidate telescopes. In an embodiment, event consumer program 122 computes a specific exposure time of the consumed event. In an embodiment, event consumer program 122 computes a number of exposures for a setup of the one or more candidate telescopes based on a pluggable algorithm known in the art. In an embodiment, if no specific algorithm is setup, event consumer program 122 computes a generic exposure time of the consumed event and a number of exposures for a setup of the one or more candidate telescopes. In an embodiment, event consumer program 122 selects one or more candidate telescopes based on the set of factors. In an embodiment, event consumer program 122 signals the one or more candidate telescopes selected. In an embodiment, event consumer program 122 signals the one or more candidate telescopes selected to capture one or more images and/or one or more video streams of the consumed event. In an embodiment, event consumer program 122 completes an asynchronous transfer of the one or more images and/or the one or more video streams of the consumed event over a network (e.g., a cloud network, e.g., network 110). In an embodiment, event consumer program 122 completes an asynchronous transfer of one or more images of the consumed event to a cloud using a robust messaging system.

In step 270, responsive to the one or more candidate telescopes selected capturing the one or more images and/or the one or more video streams of the consumed event, event consumer program 122 collects the one or more images and/or the one or more video streams of the consumed event. In an embodiment, event consumer program 122 stores the one or more images and/or one or more video streams of the consumed event (i.e., captured in step 260) as meta-data in a database (e.g., database 124). In an embodiment, event consumer program 122 stores the one or more images and/or one or more video streams of the consumed event (i.e., captured in step 260) as meta-data by attaching the one or more images and/or one or more video streams to the meta-data if stored in an object storage. In an embodiment, event consumer program 122 builds an image classification model. In an embodiment, event consumer program 122 trains the image classification model. In an embodiment, event consumer program 122 trains the image classification model using a historic consumed event and a corresponding image data. In an embodiment, event consumer program 122 trains the image classification model in order for the image classification model to label and classify one or more objects in the image captured (i.e., via the telescope network). In an embodiment, event consumer program 122 stores the image classification model. In an embodiment, event consumer program 122 stores the image classification model in a database (e.g., database 124). In an embodiment, event consumer program 122 stores event type meta-data associated with the image classification model. In an embodiment, event consumer program 122 stores event type meta-data associated with the image classification model in a database (e.g., database 124). In an embodiment, event consumer program 122 labels one or more objects in the image captured using an appropriate image classification model. In an embodiment, event consumer program 122 classifies the one or more objects in the image captured using an appropriate image classification model. In an embodiment, event consumer program 122 classifies the one or more objects in the image captured depending on the associated event type.

In step 280, event consumer program 122 publishes the one or more images and/or one or more video streams captured of the consumed event (i.e., captured in step 260). In an embodiment, event consumer program 122 publishes the one or more images and/or one or more video streams of the consumed event to a Pub/Sub mechanism (e.g., publishes the one or more images and/or one or more video streams of the consumed event to a CTN database). In an embodiment, event consumer program 122 attributes credit to the contributors of the one or more images and/or one or more video streams captured of the consumed event (i.e., the observation data).

FIG. 3 depicts a block diagram of components of server 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as event consumer program 122. In addition to event consumer program 122, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and event consumer program 122, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in event consumer program 122 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in event consumer program 122 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
monitoring, by one or more processors, for a set of published content regarding one or more astronomical events;
responsive to detecting the set of published content regarding the one or more astronomical events, extracting the set of published content regarding the one or more astronomical events;
interpreting and correlating the set of published content regarding the one or more astronomical events using natural language understanding topical analysis to identify an area in space related to the one or more astronomical events for observation of the one or more astronomical events;
implementing a monitoring system, wherein the monitoring system includes one or more registered telescopes of a network of telescopes to autonomously observe the area in space related to the one or more astronomical events;
signaling the one or more registered telescopes to capture an image of the one or more astronomical events, wherein the signaling further comprises:
selecting a distribution of the one or more candidate telescopes to observe the one or more astronomical events using an image tilting algorithm;
calculating an exposure time for each of the one or more candidate telescopes;
calculating a number of exposures for a setup of the one or more candidate telescopes; and
transmitting the exposure time and the number of exposures to each candidate telescope in the distribution;
responsive to the one or more registered telescopes capturing the image of the one or more astronomical events, classifying one or more objects in the image of the one or more astronomical events using an image classification model; and
publishing the image of the one or more astronomical events.

2. The computer-implemented method of claim 1, further comprising:
prior to monitoring for the set of published content regarding the one or more astronomical events, defining, by the one or more processors, a corpus of trusted sources of reference information related to astronomy, wherein the trusted sources of reference information are what are monitored for content related to the one or more astronomical events;

developing, by the one or more processors, a taxonomy of terms related to astronomy; and
building, by the one or more processors, a text classifier using the taxonomy of terms related to astronomy to identify one or more types of astronomical events.

3. The computer-implemented method of claim 1, wherein extracting the set of published content regarding the one or more astronomical events further comprises:
parsing, by the one or more processors, the set of published content regarding the one or more astronomical events using a web scraping tool;
extracting, by the one or more processors, one or more details regarding the one or more astronomical events from the set of published content;
classifying, by the one or more processors, the one or more astronomical events based on a text classification model trained with a set of data associated with the one or more astronomical events using a natural language classifier; and
saving, by the one or more processors, the one or more astronomical events in an event queue for downstream processing.

4. The computer-implemented method of claim 1, wherein the one or more registered telescopes of the network of telescopes includes at least one of a terrestrial telescope, a celestial telescope, a cubesat telescope, a space telescope, and an optical observation device in orbit.

5. The computer-implemented method of claim 1, wherein the one or more registered telescopes of the network of telescopes of the monitoring system are selected based on a set of factors.

6. The computer-implemented method of claim 5, wherein the set of factors includes at least one of an availability schedule of a candidate telescope, a set of geolocation coordinates of the candidate telescope and a set of celestial location coordinates of the one or more astronomical events, a set of weather conditions, a set of properties of the candidate telescope, and a set of additional properties specified by a scientific experiment.

7. The computer-implemented method of claim 1, further comprising:
subsequent to implementing the monitoring system, identifying, by the one or more processors, a scientific experiment to be performed by a member of a scientific research community;
enabling, by the one or more processors, the member of the scientific research community to set one or more parameters for the scientific experiment, wherein the one or more parameters correspond to a result to be obtained from the scientific experiment;
matching, by the one or more processors, the scientific experiment to the one or more registered telescopes;
calculating, by the one or more processors, an exposure time criterion needed to perform the scientific experiment; and
calculating, by the one or more processors, a number of images criteria needed to perform the scientific experiment.

8. A computer program product comprising:
one or more computer readable storage media and program instructions stored on the one or more computer readable storage media, the program instructions comprising:
program instructions to monitor for a set of published content regarding one or more astronomical events;
responsive to detecting the set of published content regarding the one or more astronomical events, program instructions to extract the set of published content regarding the one or more astronomical events;

program instructions to interpret and correlate the set of published content regarding the one or more astronomical events using natural language understanding topical analysis to identify an area in space related to the one or more astronomical events for observation of the one or more astronomical events;

program instructions to implement a monitoring system, wherein the monitoring system includes one or more registered telescopes of a network of telescopes to autonomously observe the area in space related to the one or more astronomical events;

program instructions to signal the one or more registered telescopes to capture an image of the one or more astronomical events, wherein the signaling further comprises:

program instructions to select a distribution of the one or more candidate telescopes to observe the one or more astronomical events using an image tilting algorithm;

program instructions to calculate an exposure time for each of the one or more candidate telescopes;

program instructions to calculate a number of exposures for a setup of the one or more candidate telescopes; and program instructions to transmit the exposure time and the number of exposures to each candidate telescope in the distribution;

responsive to the one or more registered telescopes capturing the image of the one or more astronomical events, program instructions to classify one or more objects in the image of the one or more astronomical events using an image classification model; and program instructions to publish the image of the one or more astronomical events.

9. The computer program product of claim 8, further comprising:

prior to monitoring for the set of published content regarding the one or more astronomical events, program instructions to define a corpus of trusted sources of reference information related to astronomy, wherein the trusted sources of reference information are what are monitored for content related to the one or more astronomical events;

program instructions to develop a taxonomy of terms related to astronomy; and program instructions to build a text classifier using the taxonomy of terms related to astronomy to identify one or more types of astronomical events.

10. The computer program product of claim 8, wherein extracting the set of published content regarding the one or more astronomical events further comprises:

program instructions to parse the set of published content regarding the one or more astronomical events using a web scraping tool;

program instructions to extract one or more details regarding the one or more astronomical events from the set of published content;

program instructions to classify the one or more astronomical events based on a text classification model trained with a set of data associated with the one or more astronomical events using a natural language classifier; and program instructions to save the one or more astronomical events in an event queue for downstream processing.

11. The computer program product of claim 8, wherein the one or more registered telescopes of the network of telescopes includes at least one of a terrestrial telescope, a celestial telescope, a cubesat telescope, a space telescope, and an optical observation device in orbit.

12. The computer program product of claim 8, wherein the one or more registered telescopes of the network of telescopes of the monitoring system are selected based on a set of factors.

13. The computer program product of claim 12, wherein the set of factors includes at least one of an availability schedule of a candidate telescope, a set of geolocation coordinates of the candidate telescope and a set of celestial location coordinates of the one or more astronomical events, a set of weather conditions, a set of properties of the candidate telescope, and a set of additional properties specified by a scientific experiment.

14. The computer program product of claim 8, further comprising:

subsequent to implementing the monitoring system, program instructions to identify a scientific experiment to be performed by a member of a scientific research community;

program instructions to enable the member of the scientific research community to set one or more parameters for the scientific experiment, wherein the one or more parameters correspond to a result to be obtained from the scientific experiment;

program instructions to match the scientific experiment to the one or more registered telescopes;

program instructions to calculate an exposure time criterion needed to perform the scientific experiment; and program instructions to calculate a number of images criteria needed to perform the scientific experiment.

15. A computer system comprising:

one or more computer processors;

one or more computer readable storage media;

program instructions collectively stored on the one or more computer readable storage media for execution by at least one of the one or more computer processors, the stored program instructions comprising:

program instructions to monitor for a set of published content regarding one or more astronomical events;

responsive to detecting the set of published content regarding the one or more astronomical events, program instructions to extract the set of published content regarding the one or more astronomical events;

program instructions to interpret and correlate the set of published content regarding the one or more astronomical events using natural language understanding topical analysis to identify an area in space related to the one or more astronomical events for observation of the one or more astronomical events;

program instructions to implement a monitoring system, wherein the monitoring system includes one or more registered telescopes of a network of telescopes to autonomously observe the area in space related to the one or more astronomical events;

program instructions to signal the one or more registered telescopes to capture an image of the one or more astronomical events, wherein the signaling further comprises:

program instructions to select a distribution of the one or more candidate telescopes to observe the one or more astronomical events using an image tilting algorithm;

program instructions to calculate an exposure time for each of the one or more candidate telescopes;

program instructions to calculate a number of exposures for a setup of the one or more candidate telescopes; and program instructions to transmit the exposure time and the number of exposures to each candidate telescope in the distribution;

responsive to the one or more registered telescopes capturing the image of the one or more astronomical events, program instructions to classify one or more objects in the image of the one or more astronomical events using an image classification model; and program instructions to publish the image of the one or more astronomical events.

16. The computer system of claim 15, further comprising:

prior to monitoring for the set of published content regarding the one or more astronomical events, program instructions to define a corpus of trusted sources of reference information related to astronomy, wherein the trusted sources of reference information are what are monitored for content related to the one or more astronomical events;

program instructions to develop a taxonomy of terms related to astronomy; and program instructions to build a text classifier using the taxonomy of terms related to astronomy to identify one or more types of astronomical events.

17. The computer system of claim 15, wherein extracting the set of published content regarding the one or more astronomical events further comprises:

program instructions to parse the set of published content regarding the one or more astronomical events using a web scraping tool;

program instructions to extract one or more details regarding the one or more astronomical events from the set of published content;

program instructions to classify the one or more astronomical events based on a text classification model trained with a set of data associated with the one or more astronomical events using a natural language classifier; and program instructions to save the one or more astronomical events in an event queue for downstream processing.

18. The computer system of claim 15, wherein the one or more registered telescopes of the network of telescopes of the monitoring system are selected based on a set of factors.

19. The computer system of claim 18, wherein the set of factors includes at least one of an availability schedule of a candidate telescope, a set of geolocation coordinates of the candidate telescope and a set of celestial location coordinates of the one or more astronomical events, a set of weather conditions, a set of properties of the candidate telescope, and a set of additional properties specified by a scientific experiment.

20. The computer system of claim 15, further comprising:

subsequent to implementing the monitoring system, program instructions to identify a scientific experiment to be performed by a member of a scientific research community;

program instructions to enable the member of the scientific research community to set one or more parameters for the scientific experiment, wherein the one or more parameters correspond to a result to be obtained from the scientific experiment;

program instructions to match the scientific experiment to the one or more registered telescopes;

program instructions to calculate an exposure time criterion needed to perform the scientific experiment; and program instructions to calculate a number of images criteria needed to perform the scientific experiment.

* * * * *